United States Patent [19]
Quinting et al.

[11] 3,877,115
[45] Apr. 15, 1975

[54] PUSHBUTTON RELEASE CONNECTOR

[75] Inventors: Franz G. R. Quinting, Clawson; Robert W. Stoffel, Ferndale, both of Mich.

[73] Assignee: International Engineering Service, Inc., Royal Oak, Mich.

[22] Filed: May 20, 1974

[21] Appl. No.: 471,291

[52] U.S. Cl............................. 24/230 R; 24/230 AL
[51] Int. Cl............................................ A44b 11/26
[58] Field of Search.. 24/230 AL, 230 AN, 230 AV, 24/230 AT, 230 R, 211 K

[56] References Cited
UNITED STATES PATENTS
3,145,442  8/1964  Brown............................ 24/230 AL
3,597,811  8/1971  Cunningham.................. 24/230 AU

*Primary Examiner*—Bernard A. Gelak
*Attorney, Agent, or Firm*—Hauke Gifford Patalidis & Dumont

[57] ABSTRACT

A pushbutton release connector for releasably interconnecting two separate elements and more particularly for releasably connecting the end of a motor vehicle passenger restraining belt to a floor anchoring strap or cable, the connector comprising a frame having parallel sidewalls accepting therebetween the end of a disconnectable element, such as a tongue on the end of a belt webbing, a locking bar freely disposed through aligned slots in the frame sidewalls and in the legs of a slide straddling the frame, and a spring biasing means for urging the slide and the locking bar into a laterally disposed open slot in the tongue. The tongue is released by depressing the slide by means of a pushbutton against the spring bias for disengaging the locking bar from the open slot in the tongue. In addition, spring biasing means are provided for urging the tongue from within the frame upon disengagement of the locking bar.

11 Claims, 5 Drawing Figures 3,877,115

PUSHBUTTON RELEASE CONNECTOR

BACKGROUND OF THE INVENTION

Motor vehicles are now generally provided with passenger body restraint means in the form of a lap belt combined or not with a shoulder strap. In some countries, motor vehicle passenger restraint means are required by law or by regulation. Diverse arrangements of lap belt alone or lap belt and shoulder strap combinations have been devised, requiring connector means for attaching together two separate ends of a belt webbing or strap, for attaching the end of a strap to an anchoring point affixed to a structural element of the passenger compartment such as the floor, or to the vehicle frame by way of appropriate apertures through the floor, for example.

Releasable connectors for passenger restraint lap belts and shoulder straps must meet certain requirements, some of which relate to convenience of operation by the user and others which relate to generally accepted safety standards. For example, the connectors must be simple and convenient to operate, they must be provided with a release mechanism, preferably operable with a single finger, conveniently arranged such as to be easily operated when desired and relatively protected against involuntary release. In addition, the connector must be capable of maintaining the locked elements in a locked mode even though a considerable load may be applied, tending to separate the locked elements. The connection between the lockable elements should preferably be effected without the requirement of manipulating a control and should therefore be effected automatically through direct engagement of the lockable elements. The unlocking of the elements must preferably be safely accomplished with little effort on the part of the user, even when the connector assembly is under load.

Further requirements to be considered are simplicity of structure providing a connector assembly relatively easy to manufacture and assemble at low cost by mass production means, and distracting as little as possible from the interior decor of a motor vehicle.

SUMMARY OF THE INVENTION

The principal object of the present invention is therefore to fulfill the requirements of a releasable connector, particularly for a restraining lap belt or shoulder strap for motor vehicle passengers, which is simple in structure, consists of few parts, is easy to assembly, is foolproof in operation and use, is capable of high retaining power under load and may be released with very little effort. These diverse objects are accomplished by the present invention by providing a frame member disposed in a housing of any convenient shape and appearance, the frame member having parallel sidewalls accepting therebetween the prong or tongue of a disconnectable element, and by providing a locking bar projecting through opposed closed slots in the frame sidewalls displaceable by means of a slide into a laterally open slot in the tongue of the releasably connectable element, by providing spring bias means for urging the locking bar into engagement with the tongue open slot, and by providing a combination of elements and a geometry of co-acting elements preventing inadvertent disconnect and easy voluntary disconnect.

The many objects and advantages of the present invention will be best understood by those skilled in the art when the following description of the best mode contemplated for practicing the invention is read in conjunction with the accompanying drawings.

BRIEF DESCRIPTION OF THE DRAWINGS

In the diverse views in the drawings, wherein like parts are identified by like reference numerals.

DETAILED DESCRIPTION OF THE PREFERRED EMBODIMENT

Figure 1:
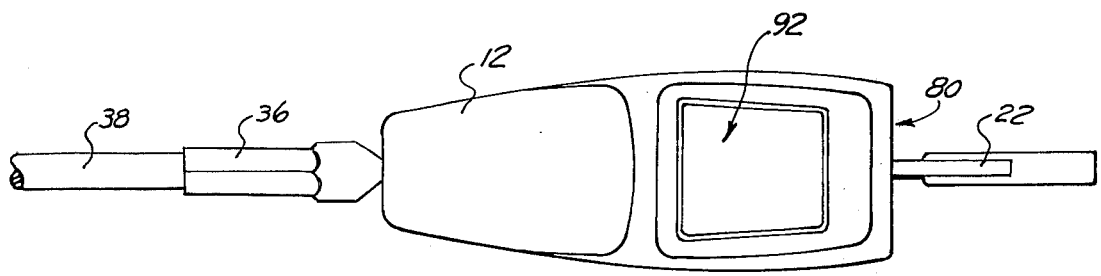
FIG. 1 is a top elevation view of an example of a releasable connector according to the present invention.

The particular structural embodiment of the present invention is shown in the drawing for illustrative purposes as a connector for releasably attaching the end of a lap belt to a floor anchoring element mounted, for example, on the side of a passenger seat in a motor vehicle. It will be appreciated, however, that the connector of the invention may be used for releasably attaching the end of a shoulder strap to an anchoring point such as a lap belt or a floor mount or, alternatively, the connector of the invention may be used as a safety belt buckle disposed between two lengths of a lap belt webbing, or the like.

Figure 2:
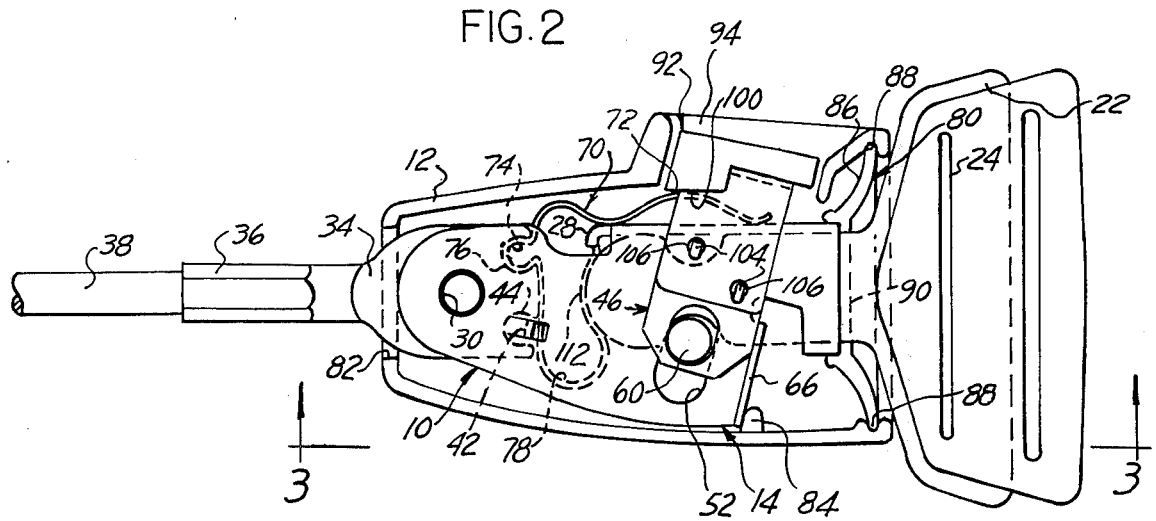
FIG. 2 is a side elevation thereof with a portion of the housing removed to reveal the internal construction.
Figure 3:
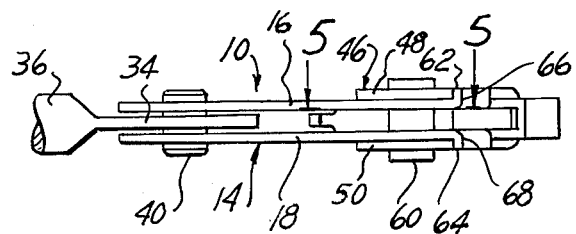
FIG. 3 is a bottom view of the connector as seen from line 3—3 of FIG. 2 with the housing and the disconnectable element not shown.
Figure 4:
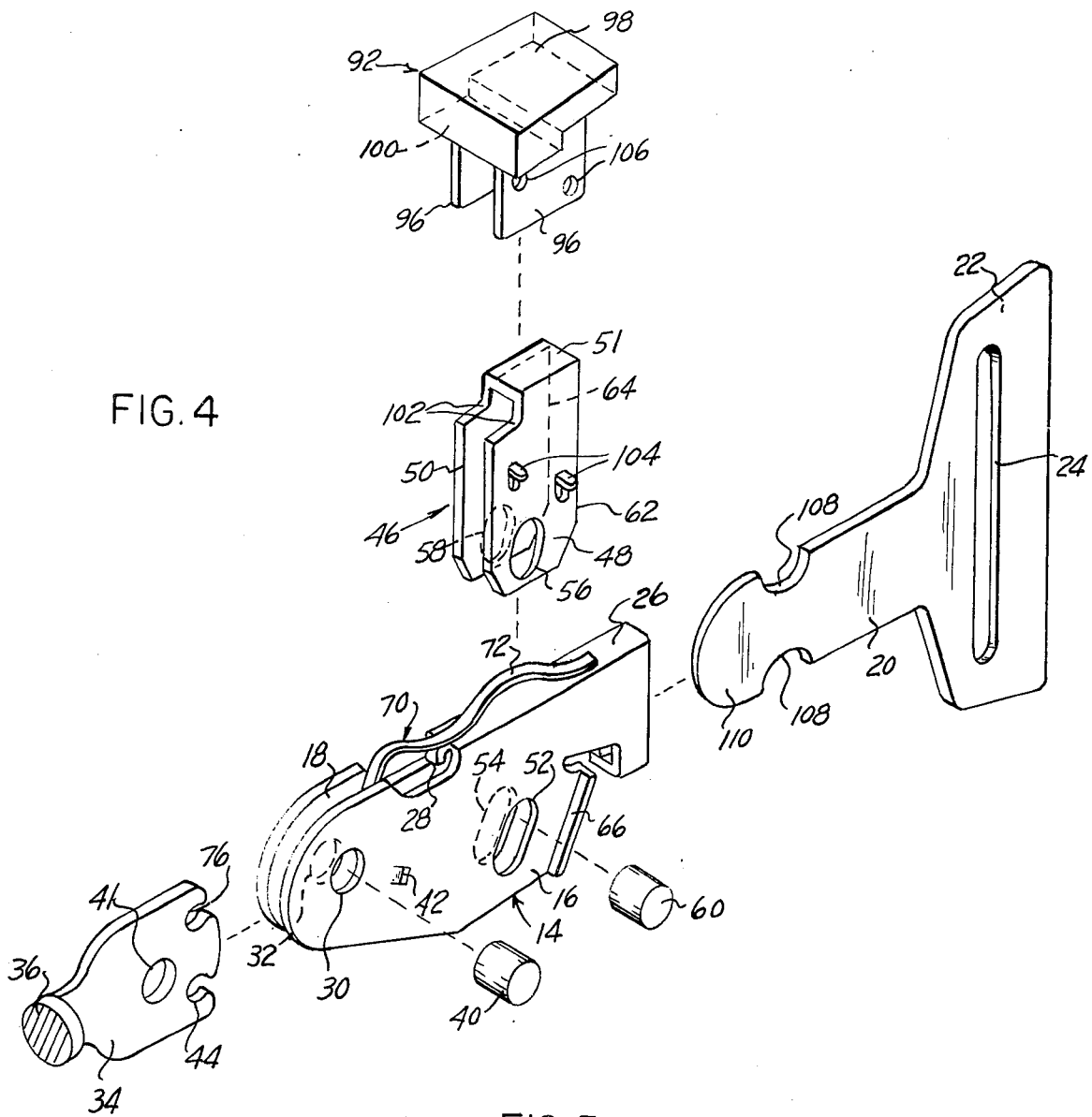
FIG. 4 is a perspective exploded view thereof, the housing being omitted.

Referring now to the several views, and more particularly to FIGS. 2–4, the releasable connector of the invention, generally designated at 10, is normally enclosed in an appropriate housing 12 (FIGS. 1 and 2), made of any convenient material such as molded plastic, for example. The connector 10 takes the form of a frame member 14, defining the female receptacle portion of the connector, adapted to accept between two parallel spaced apart sidewalls 16 and 18 the tongue member 20 of a male element. The tongue member 20 is provided with an integral enlarged ear portion 22 having an appropriate transverse narrow slot 24 for attaching thereto the end of a strap or belt in the form of a fabric web, not shown.

The frame member 14 is preferably made of a single stamping of sheet steel of an appropriate gauge bent over so as to form the two sidewalls 16 and 18 disposed substantially parallel to each other and rigidly interconnected by means of a narrow side 26, such that the frame member 14 is substantially in the shape of an inverted U in cross-section. The narrow side 26 of the frame member 14 extends longitudinally part of the length of the frame member and ends intermediate the ends of the frame member in the form of an inwardly bent end flange 28. Proximate an end of the frame member 14 there is provided a pair of opposed circular apertures 30 and 32, one in each sidewall, for attaching thereto the widened and flattened head 34 of a fitting 36 fastened to the end of an appropriate floor anchoring element such as a cable 38, for example. The head 34 of the fitting 36 is fastened to the end of the frame member 14 by means of a pin 40 engaged through the apertures 30 and 32 in the sidewalls 16 and 18 and a corresponding aperture 41 in the fitting head 34. A tang 42 is formed in at at least one sidewalls, such as sidewall 16, and the tang 42 is inwardly bent so as to engage a cut-out portion 44 on the forward edge of the head portion 34 of the fitting 36, such that when the fitting 36 is attached to the frame member 14 by means of the pin 40 engaged in the aligned mounting apertures 30, 32 and 41, as is best shown at FIGS. 2 and 3, the fitting head 34 is prevented from pivoting about the pin 40 relatively to the frame member 14.

A slide 46, made of an appropriately U-shaped sheet steel blank, is disposed transversely over the frame member 14 so as to straddle the frame member, with a leg 48 of the slide 46 disposed in sliding engagement with the exterior surface of the sidewall 16, and another leg 50 in sliding engagement with the exterior surface of the sidewall 18. The legs 48 and 50 are integrally connected at their top by way of a bridging portion 51 of the slide. Each of the sidewalls 16 and 18 of the frame member 14 is provided with a slot shown respectively at 52 and 54, and each of the legs 48 and 50 of the slide 46 is provided with a corresponding but shorter slot, shown respectively at 56 and 58, such that a locking bar preferably in the form of a circularly cylindrical pin 60 is loosely accepted through the aligned slots 56, 52, 54 and 58, as best shown at FIGS. 2 and 3, with the slide 46 disposed in its straddling position over the frame member 14 and with the edges 62 and 64 of the legs 48 and 50, respectively, in guiding sliding engagement each with a member defined by one of the right angled outwardly projecting flanges 66, 68 formed integral respectively with the sidewall 16 and the sidewall 18 and disposed substantially parallel to the longitudinal centerlines of the aligned slots 52 and 58.

A flat spring 70 is disposed with an end engaging the upper surface of the narraw side 26 of the frame member 14, and its other end engaged between the sidewalls 16 and 18 and abutting below the inwardly projecting end flange 28. The flat spring 70 is shaped so as to form a compressible bowed portion 72 above the narrow side 26 of the frame member and a loop 74 (FIG. 2) engaged in a recess 76 in the end of the fitting head 34. The spring 70 further forms a large loop 78 extending downwardly into the frame member 14 between the sidewalls 16 and 18.

The assembly consisting of the frame member 14, with the cable fitting 36 assembled thereto by means of the pin 40, and the slide 46 disposed in its appropriate position straddling the frame member with the pin 60 and the spring 70 in its assembled position, is introduced into the housing 12 through an opening 80 at one end of the housing 12. The opposite end of the housing 12 is provided with another opening 82 allowing the fitting 36 to project therethrough. The assembly is held in the housing by appropriate tangs and abutment means, one of which is shown at 84, appropriately disposed and engaging the frame member 14, in a manner well known. The housing 12 may be made of a relatively flexible material which permits the housing walls to resiliently deflect and snap back into their original position for adequately holding the frame member in the housing. The opening 80 at one end of the housing 12 is partly closed by way of a flexible plastic retainer ring 86, having an outer edge engageable in a groove 88 formed on the interior surface of the housing about the periphery of the opening 80 and a substantially centrally disposed flanged aperture 90 affording passage to the male tongue member 20 therethrough. To complete the assembly, a pushbutton 92 preferably made of a molded plastic material, is slipped through an opening 94 disposed on the top of the housing 12.

As best shown at FIG. 4, the pushbutton 92 has a pair of downwardly extending parallel legs 96 spaced apart such as to straddle the slide 46. The pushbutton 92 has an enlarged head portion 98 provided with a downwardly projecting wedge 100 adapted to engage the upper surface of the bowed end portion 72 of the spring 70, an appropriate cut-out recess 102 being formed in the upper end of the legs 48, 50 and in the bridging portion 51 of the slide 46 for accommodating the wedge 100. The legs 96 of the pushbutton 92 are relatively flexible such as to be capable of flexing apart for passing over the outwardly projecting tangs 104 formed on the legs of the slide 46, and of snapping back into position with the tangs 104 projecting into corresponding apertures 106 formed in the pushbutton legs 96, thus resiliently holding the pushbutton 96 is assembly straddling over the slide 46.

The tongue 20 of the male element is provided proximate its end with a laterally extending open slot 108. In the example illustrated, the tongue 20 is provided with a pair of symmetrically disposed slots 108, such that the tongue may be locked into the frame member 14, as will be hereinafter explained, without regard to relative orientation. The end of the tongue 20 is provided with a leading edge 110 convexly diverging from the centerline to the side of the tongue which, in example illustrated, is in the form of a curvilinear edge. In this manner, when the tongue 20 is introduced into the frame member 14 between the sidewalls 16 and 18, the pin 60 laterally engages the edge 110 of the tongue 20 and is displaced laterally, remaining held in sliding engagement with the edge 110 until, under the urging of the spring 70 transmitted to the pin 60 through the slide 46, the pin 60 is caused to drop into the open slot 108, thus locking the tongue 20 in the frame member 14.

As best seen in FIG. 2, in such locked mode the extreme end of the tongue 20 engages the portion 112 of the spring 70 situated between the loop 78 and the spring end abutting the retaining flange 28. In order to unlock the tongue 20 from the frame member 14, the pushbutton 92 is manually depressed, thus compressing the bowed portion 72 of the spring 70 and displacing the slide 46 downwardly. The upper ends of the slots 56 and 58 in the legs 48 and 50 of the slide 46 engage the pin 60 and displace it downwardly, thus releasing the tongue 20 as a result of the pin 60 being disengaged from the open slot 108. The tongue 20 is automatically urged from the frame member 14 as a result of the portion 112 of the spring 70 between the loop 78 and the inwardly bent end flange 28 applying a force on the end of the tongue 20.

The locking bar can take any appropriate peripheral shape but it is preferably in the form of the cylindrical pin 60 illustrated The pin 60 has a diameter which is slightly less than the width of the slots 56–58 in the legs 48, 50 of the slide 46 and the width of the corresponding slots 52 and 54 in the sidewalls 16 and 18 of the frame member 14. As best shown in the enlarged view of FIG. 5, the depth of the lateral open slot 108 in the tongue 20, referenced by the dimension D in FIG. 5, is greater than the radius of the pin 60 such that when the pin 60 is fully engaged into the open slot 108 it tangentially engages the forward side 114 of the slot 108 at a point 116 well within the slot 108.

The elongated aligned slots 52, 54 disposed in the sidewalls 16, 18 of the frame member 14 determine the allowable longitudinal movement of the pin 60. The longitudinal centerlines of these elongated slots are not perpendicular to the centerline of the tongue 20 but are inclined as shown in FIG. 5. The inclination is such that when a load (shown diagrammatically at 120) is applied on the tongue 20 tending to pull the tongue from the frame member 14, the load causes a reaction tending to urge the pin 60 into positive engagement with the bottom of the open slot 108, such a tendency being augmented by the action of the spring 70 tending to urge the slide 46 upwardly.

Figure 5:
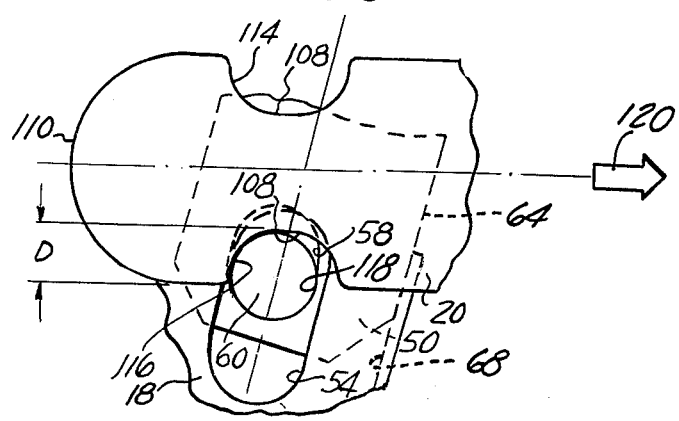
FIG. 5 is a fragmentary view, at an enlarged scale as seen from line 5—5 of FIG. 3 with the disconnectable element shown in connnected position.

It will be understood that the description of cooperation between the elements shown in FIG. 5 applies to corresponding elements which have been broken away for the sake of clarity. The load 120 applied to the tongue 20 is transferred to the pin 60 at the point of contact 116. This load on the pin 60 is in turn transferred to the leg 50 on the slide 46 at a point 118 in the elongated slot 58. This load in the leg 50 is transferred to the frame 14 through the right angled outwardly projecting flange 68 on the sidewall 18 at the region where the edge 64 on the leg 50 contacts the flange.

Only a few pounds of force must be manually applied on the slide 46 to unlock the connector regardless of the presence or absence of the load 120 on the tongue 20. This force is required to depress the bowed portion 72 of the spring 70 and to cause the pin 60 to roll out of engagement with the open slot 108 as the pin 60 rolls between the forward side of the open slot 114 and the side edges of the elongated slots 56 and 58. As the leg 50 moves downwardly the point of contact 116 between the pin 60 and the open slot 108 moves closer to the outside edge of the tongue 20 and the point of contact 118 between the pin 60 and one side of the elongated slot 58 moves further up the slot. This rolling motion continues until the center of the pin 60 rolls past the corner slot the open slot 108 at which point it pops out releasing the connector. When the load 120 is not present on the tongue 20 the pin 60 does not roll out of engagement with the open slot 108 but slides out as a result of the upper ends of the elongated slots 56 and 58 in the slide 46 peripherally engaging the pin 60 as the slide 46 moves downwardly.

It will be apparent that the best mode for practicing the invention herein disclosed is well calculated to fulfill the objects of the invention, and it will be appreciated that the invention is susceptible to modification, variation and change without departing from the proper scope and meaning of the claims.

What is claimed is:

1. A releasable connector comprising an elongated frame member having an open end and a pair of substantially parallel sidewalls, a tongue member adapted for introduction into said frame member between said sidewalls through the open end of said frame member, a bifurcated slide member substantially transversely disposed over said frame member, said slide member having a pair of parallel legs straddling said frame member each in sliding engagement with the exterior surface of one of said sidewalls, a closed slot in each sidewall and in each leg of said slide member, said closed slots having their longitudinal axis along the axis of travel of said slide member and being in transverse alignment across said frame member, a locking bar loosely disposed through said slots, an open slot formed on a side of said tongue member, means for normally biasing said slide member in a direction urging said locking bar into said open slot when said tongue member is introduced into said frame member to a position permitting said locking bar to laterally project into said open slot, and means for manually applying to said slide member a force displacing said slide member in a direction disengaging said locking bar from said open slot.

2. The connector of claim 1 wherein said locking bar is a circularly cylindrical pin.

3. The connector of claim 1 further comprising means for attaching a cable end to the other end of said frame member.

4. The connector of claim 1 wherein said tongue member has a diverging edge for engaging said locking bar during introduction of said tongue member into said frame for laterally displacing said locking bar against said biasing means.

5. The connector of claim 1 further comprising means at said tongue member for attaching a strap to said tongue member.

6. The connector of claim 1 further comprising means for biasing said tongue member in a direction urging said tongue from said frame member.

7. The connector of claim 1 wherein an end of said slide member has a pushbutton directly attached thereto for applying to said slide member said force disengaging said locking bar from said open slot.

8. The connector of claim 4 wherein said diverging edge is convexly curvilinear.

9. The connector of claim 6 wherein said means for biasing said slide member and said means for biasing said tongue member comprise a single elongated flat spring having an end portion disposed between said sidewalls for engaging the end of said tongue member and another end portion disposed exteriorly to said frame member for biasing said slide member.

10. The connector of claim 1 further comprising sliding abutment means formed on each sidewall for engaging a lateral edge of said legs, said abutment means being disposed so as to oppose a force tending to pull said tongue from said frame member.

11. The connector of claim 2 wherein said open slot in said tongue member is substantially semicircular, has a diameter slightly larger than the diameter of said cylindrical pin and a depth slightly larger than the radius of said cylindrical pin.

* * * * *